Jan. 12, 1965  J. G. BAKER  3,165,070
CONNECTOR FOR FLUID SYSTEM COMPONENTS
Filed June 3, 1963  3 Sheets-Sheet 1

INVENTOR.
JOHN GORDON BAKER
BY Joseph G. Werner
ATTORNEY

Jan. 12, 1965 J. G. BAKER 3,165,070
CONNECTOR FOR FLUID SYSTEM COMPONENTS
Filed June 3, 1963 3 Sheets-Sheet 2

INVENTOR.
JOHN GORDON BAKER
BY Joseph G. Werner
ATTORNEY

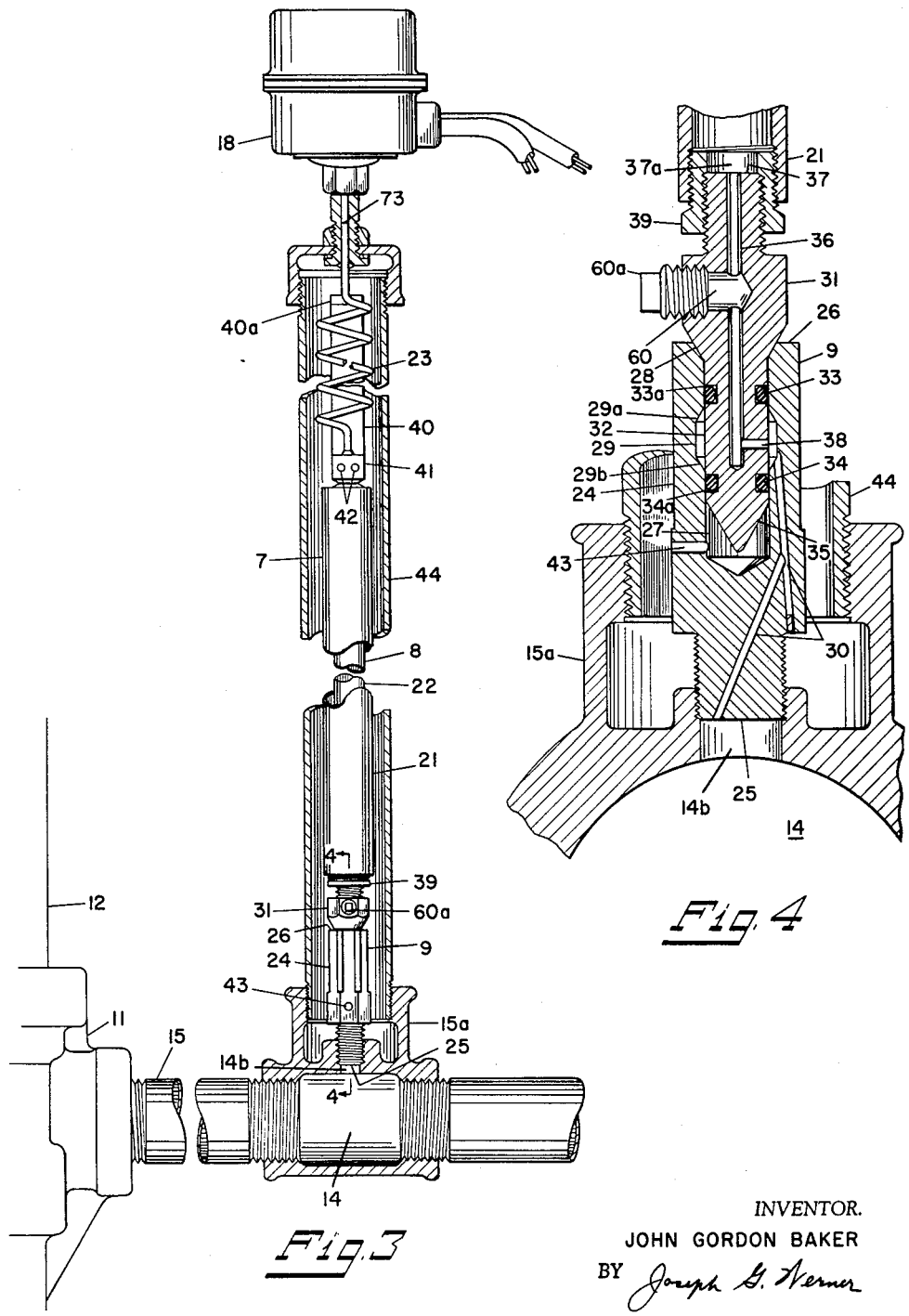

United States Patent Office 3,165,070
Patented Jan. 12, 1965

3,165,070
CONNECTOR FOR FLUID SYSTEM COMPONENTS
John Gordon Baker, Evansville, Wis., assignor to Baker Manufacturing Company, Evansville, Wis., a corporation of Wisconsin
Filed June 3, 1963, Ser. No. 285,050
12 Claims. (Cl. 103—202)

This application is a continuation-in-part of application Serial No. 192,879, now abandoned.

This invention relates to connectors for fluid-tight connection of fluid system components to a pressure source within a casing, and particularly to quick connect and disconnect connectors adapted to support water system components within a casing and to facilitate the installation within and removal from said casing of such components without disturbing the water system piping.

Pitless pump installations generally have the pressure tank for the water system located in the building served by the system or buried outside the building foundation. The pressure switch and motor control box are preferably located within the well casing as described more fully in my Patent No. 3,054,022, issued September 11, 1962, or above ground at the well, as more fully disclosed in my co-pending application Serial No. 49,574, filed August 15, 1960, now U.S. Patent No. 3,123,689. The present invention is an improvement on the inventions in the above identified patent and application.

It is a primary object of my invention to provide a connector which makes practical quick, easy installation and servicing of a motor pressure control located within the well casing of a pitless well installation.

It is a further object of my invention to provide for pitless well construction a connector located within the well casing for a pump motor control component which may be readily disconnected and reconnected for servicing such components outside of the well casing without pulling the pump or drop pipe from the casing.

It is a still further object of my invention to provide a quick connect and disconnect connector for a pump motor control to support control components within the well casing and provide a fluid-tight conduit connection for such a control. It is an additional object of my invention to provide a quick connect and disconnect conduit coupling for pitless well construction which can be adapted for use with an air fitting for charging air into a pressure tank.

Yet another object of my invention is to provide a quick connect and disconnect connector which combines the air charging function with the conduit connecting and control component support functions mentioned above.

Other objects and advantages will be apparent from the following detailed description, taken in conjunction with the accompanying drawings, wherein FIG. 1 is a fragmentary vertical section view of a pitless well installation showing an embodiment of the principles of my invention.

FIG. 3 is a vertical partial section view of an external stand pipe within which my invention is used to connect and support a pump motor control component.

FIG. 4 is a partial section view of the principal components of my connector taken along section line 4—4 of FIG. 3.

Figure 1:
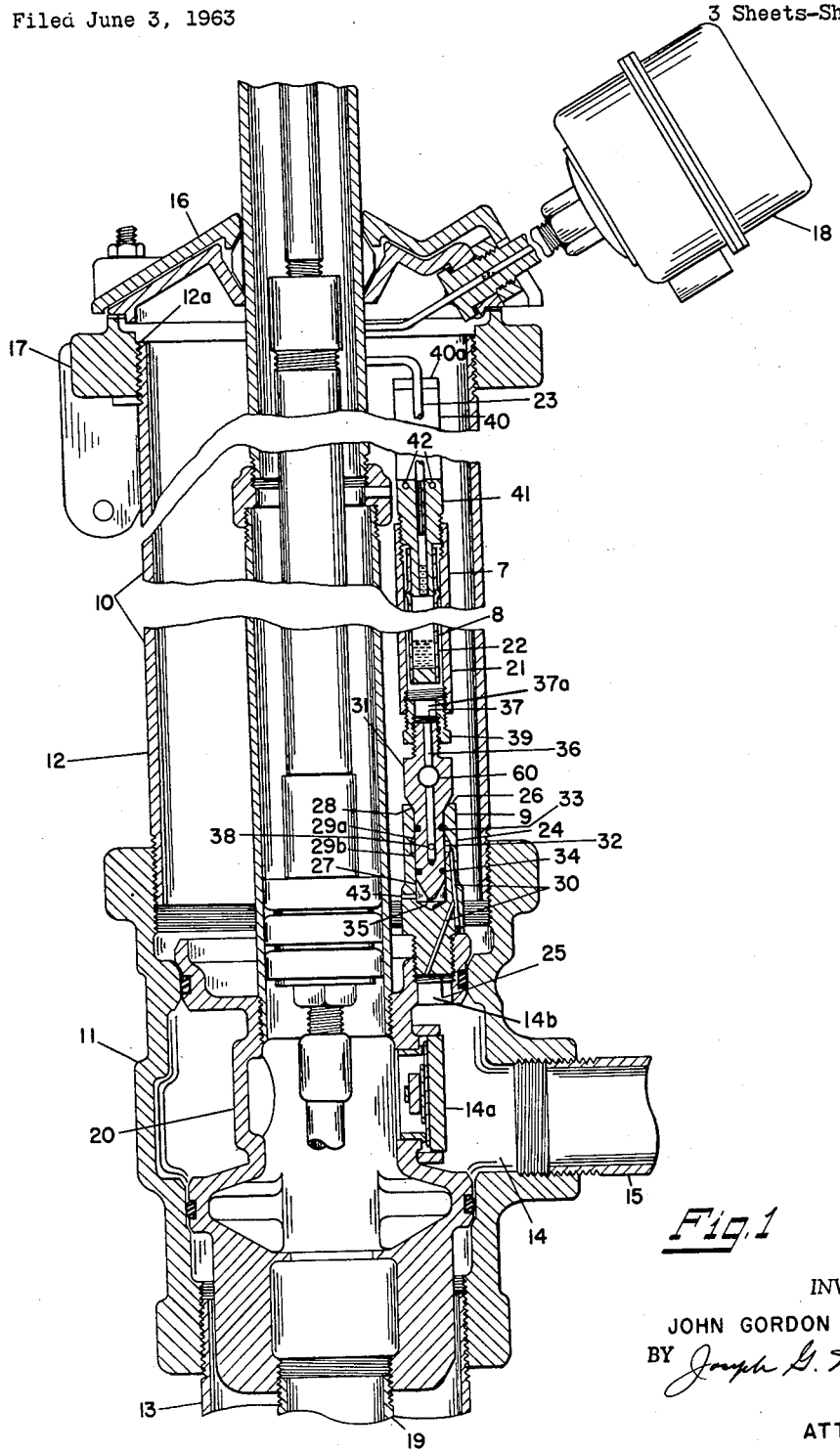

Referring more particularly to the drawings in which like numbers refer to like parts, FIG. 1 shows a typical pitless installation 10 for a reciprocating deep well pump with a discharge body 11 (also called a casing fitting) located below the frost line and threadedly connected to aligned casings 12 and 13. Water is pumped up through the drop pipe 19 into the spool 20 (also called a drop pipe fitting) through the check valve 14a and into the passage 14. The passage 14 includes the annular space within the discharge body 11 surrounding the spool 20 and extending through the discharge pipe 15 which leads to and beyond the pressure tank (not shown). The water pressure in the pressure tank may be approximately determined from the pressure in the water passage 14. The upper casing 12 projects above the ground level and is closed by a two-part cap 16 bolted to a ring 17 which is threadedly connected to the upper casing 12. The cap 16 supports the pressure switch 18 which controls the motor (not shown) for the pump, which is preferably of the construction of Baker et al. U.S. Patent No. 2,657,633.

As more fully described in my above mentioned co-pending application, Serial No. 49,574, the pump motor controls 7 include a pressure switch 18 and a pressure sensing device 8 which signals the pressure switch 18 of changes in water pressure at the water passage 14. The water pressure is transmitted to the rigid pipe 21 of the pressure sensing device 8, which is located below the frost line. The changing water pressure causes the enclosed flexible fluid retainer tube 22 to contract and expand. The fluid retainer tube 22 is connected to the pressure switch 18 by a capillary tube 23. The fluid retainer tube 22 and capillary tube 23 are filled with a nontoxic liquid which will not solidify at freezing temperatures. As the fluid retainer tube 22 contracts and expands with changing water pressures, the increasing and decreasing pressures are transmitted to the pressure switch 18 by the nontoxic, nonfreezing liquid through the capillary tube 23. The control system is adjusted so that when the water pressure in the water passage 14 drops to a certain predetermined level, the pressure switch 18 is actuated, causing the motor to start and the pump to begin operation. As the pressure tank is filled and the water pressure in the tank and the water passage 14 increases, the fluid retainer tube is compressed and the increased pressure is transmitted to the pressure switch 18. When the pressure reaches a certain predetermined higher level, the pressure switch 18 shuts off the pump motor and the cycle is repeated.

In the structure as shown in by co-pending application Serial No. 49,574, it is quite difficult and time consuming to remove and replace the rigid pipe within the well casing. My novel connector, shown generally at 9 and hereinafter described, provides a quick and easy means of connecting and disconnecting the motor control pressure sensing device 8 within the well casing 12 of the pitless pump installation described above. The connector 9 provides a fluid tight conduit between the upper and lower terminal passages 37a and 14b. The connector 9 has a socket member 24, best shown in FIG. 4, which has a base end 25 which may be threadedly attached to the spool 20 so to be in communication with the lower terminal passage 14b, water passage 14 and the discharge pipe 15. Starting at the mouth end 26 of the socket member 24, a socket 27 extends downwardly to a bottom 27a. The socket 27 may have a tapered mouth 28 as shown. An annular channel 29 extends around the socket 27 approximately midway along its length. Otherwise the socket 27 is cylindrical, except that it may be conical at the bottom 27a to facilitate machining. The channel 29 is connected to the terminal passage 14b by means of interconnected passages 30 extending upwardly through the socket member 24 from its base end 25.

My invention has as an additional element plug member 31 with a downward extending plug 32. The plug 32 may be withdrawably inserted within the socket 27. The plug member 31 has a tapered shoulder 28a which mates with the tapered mouth 28 of the socket member 24. The tapered mouth 28 is thus the surface which directly supports the plug member 31 and connected components. The diametrical clearance between the plug 32 and the cylindrical walls of the socket 27 may be from about one to about five thousandths of an inch. Upper and lower ring seals 33 and 34 of yieldable material are carried by upper and lower grooves 33a and 34a, respectively of the plug 32 and provide fluid-tight seals above and below channel 29. The channel 29 may have tapered upper and lower edges 29a and 29b, which with the tapered mouth 28 prevent damage to the ring seals 33 and 34 when the plug 32 is inserted into or withdrawn from the socket 27. The plug 32 preferably has a tapered end 35 to facilitate its entry into the socket 27. A center passage 36 extends from the end 37 of the plug member 31 into the plug 32 to the radial passage 38 which communicates with the channel 29. The sizes of one or more of the passages 30, 36, and 38 are chosen small enough to serve as a pressure shock dampener to reduce the transmission of sudden changes of pressure from the terminal passage 14b to the passage 37a. The plug member 31 may be attached to the rigid pipe 21 by a reducer bushing 39 as shown.

It is desirable that the socket member 24 have a pressure relief hole 43 located below the lower ring seal 34, as shown, to prevent the plug member 31 from blowing out if the lower seal 34 should leak. The pressure relief hole 43 extends through the socket member 24 in communication with the pressure within the casing 12 which is ordinarily atmospheric. Since the mating of the connector members 24 and 31 forms no closed pressure chamber which initially changes volume as said members are separated, because of the principle of conservation of energy there can be no pressure resultant force tending to separate or hold together the mated members. Such members are maintained in mated relation by gravity and friction only.

Referring to FIG. 1, a lift-out bar 40 is preferably attached to the coupling 41 to provide means with which to raise and lower the plug member 31 and attached pressure sensing device. The lift-out bar 40 may be attached to the coupling 41 by means of rivets 42, or it may be attached to the rigid pipe 21, or the plug member 31, and may be of whatever length is required, depending on the depth the delivery pipe 15 is buried. The lift-out bar 40 extends upward within said upper casing 12, and has an upper end 40a near the upper casing top end 12a, as shown.

In use, my plug member 31 with attached rigid pipe 21, coupling 41 and capillary tube 23 is inserted within the upper casing 12 and lowered therein until the tapered end 35 of plug 32 enters the mouth 28 of the socket 27. The lift-out bar 40 is then pressed downward to force the plug 32 fully within the socket 27 so that the lower ring seal 34 is located below the channel 29 and the upper ring seal 33 is above the channel 29. Once my connector 9 has been plugged in as described, the water pressure in the water passage 14 and terminal passage 14b is transferred through the passages 30 to the channel 29, then through the radial passage 38 to the center passage 36 and upward into the rigid pipe 21. The water pressure changes are then transferred to the pressure switch 18 in the same manner as described in co-pending application Serial No. 49,574, mentioned above. My connector 9 makes it equally easy to remove the pressure sensing device 8 from the casing 12. The cap 16 is first removed from the casing 12, whereupon the plug member 31 and attached pressure sensing device 8 may be unplugged and removed from the casing 12 by means of the lift-out bar 40.

It can be seen that no special tools are needed to remove or replace the motor controls with my connector 9. The socket member 24 may be threadedly attached to the spool 20 when the spool is still above ground level. After that the plug member 31 may be simply plugged into or unplugged from the socket member 24, as desired.

FIG. 3 shows an alternate external use for my connector 9 with an external stand pipe 44 extending upward from a pipe fitting 15a located on the discharge pipe 15 between the discharge body 11 and the pressure tank. The operation of the pump motor controls 7 and my connector 9 within the stand pipe 44 is identical to that in the device of FIG. 1.

Figure 2:
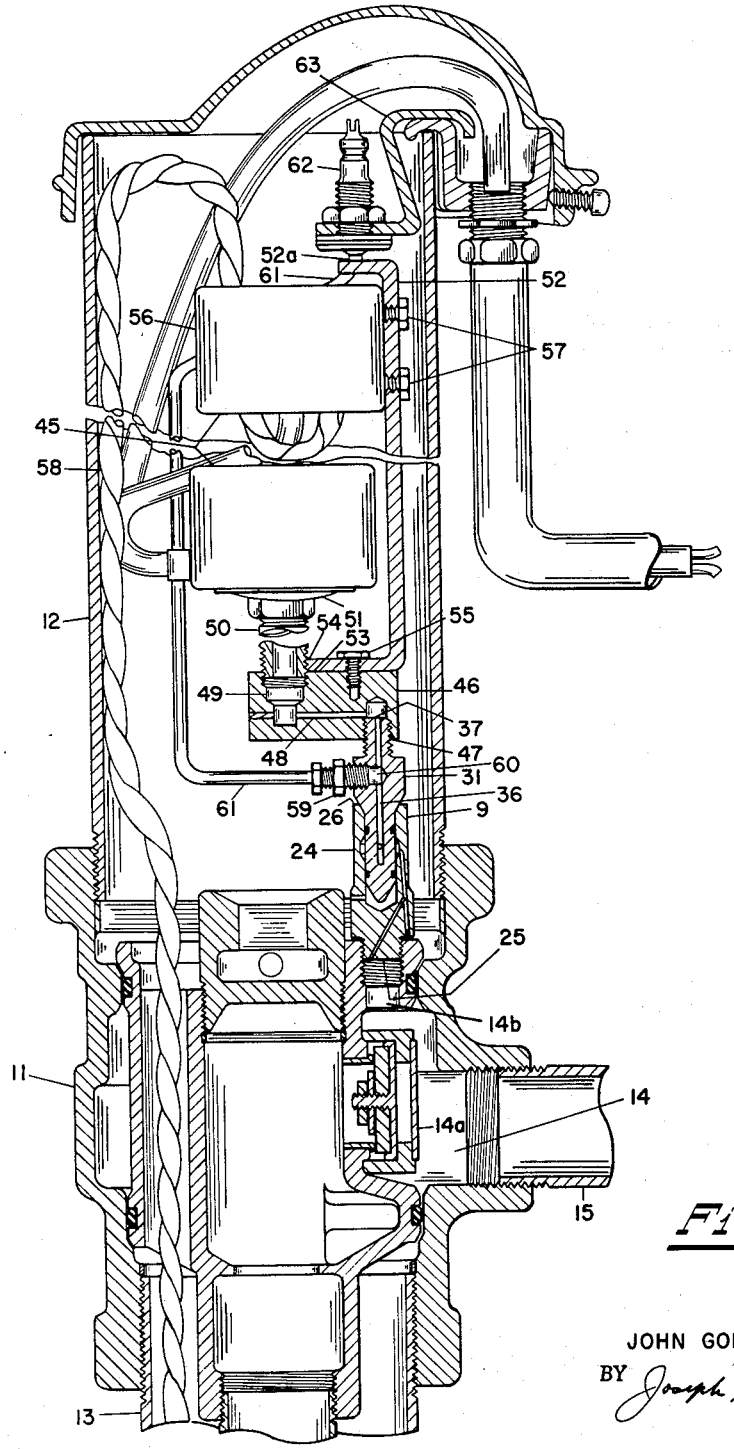
FIG. 2 is a fragmentary vertical section view of a pitless well installation showing a modification of my invention for use with a submersible pump motor control.

My connector is equally well suited for use with a pitless pump installation having submersible motor controls 45, more fully described in my above mentioned Patent No. 3,054,022. FIG. 2 shows that the socket member 24 and the plug member 31 are unchanged in a submersible unit.

A control adapter 46 is threadedly attached to the plug member top end 37 at its inlet opening 47. The control adapter 46 has a connector passage 48 extending between the inlet opening 47 and the outlet opening 49. A pipe nipple 50 is threaded to the outlet opening 49, and supports the submersible pressure switch 51, which is located below the frost line. The outlet opening 49 may be laterally offset from the inlet opening 47, as shown, to permit the pressure switch 51 to be centered within the casing 12 even if the plug member is off center, to allow the use of a relatively small casing 12. The modified lift-out bar 52 has a top end 52a and a horizontal section 53 which is preferably attached to the control adapter 46 by a capscrew 55. The end 54 of the horizontal section 53 may be slotted to fit around the pipe nipple 50 to prevent rotation of the lift-out bar 52 around the control adapter 46.

The control box 56 may also be supported within the casing 12 by the lift-out bar 52, depending on its size. FIG. 2 shows the control box 56 attached to the lift-out bar 52 by a pair of support bolts 57.

When in use, the water pressure is transferred from the plug member center passage 36 through the control adapter inlet opening 47, the terminal passage 48 and the outlet opening 49 to the pipe nipple 50 and the pressure switch 51. The plug member 31, the control adapter 46, the pressure switch 51 and the control box 56, which are all supported by the connector 9, can be quickly removed from the casing 12 by lifting up the lift-out bar 52 to unplug the connector 9. The control cable 58 extending from the control box 56 to the pump motor (not shown) should have sufficient slack to enable the motor controls 45 to be lifted free of the casing. The removed submersible pump controls 45 can be replaced within the casing 12 by simply plugging the plug member 31 into the socket member 24.

The submersible motor controls can be operated outside the casing 12 for inspection and repair purposes by inserting an extension pipe between the plug member 31 and the control adapter 46.

FIG. 2 further illustrates how an air fitting 59 may be connected to an air fitting hole 60 in the plug member 31 to supply air to the pressure tank when needed. The air fitting 59 is connected to the valve 62 by an air line 61. The air valve 62 is preferably supported near the top of the casing 12 by an air line holder 63. The air fitting hole 60 is in communication with the plug member center passage 36. Air may be supplied to the pressure tank by simply attaching an air pressure supply hose to the air valve 62. Air charging of a tank may be similarly accomplished with the devices of FIG. 1 and FIG. 3. If it is not necessary to air charge the pressure tank from the well, a plug 60a may be threadedly connected to the air hole 60, as illustrated in FIGS. 1 and 3.

Modifications of my connector 9 which may obviously be made without departing from the principles of my invention include inversion of the connector plug and socket members so that the plug member 31 is attached to the spool 20 or drop pipe fitting and the socket member 24 is in communication with the system components. Another obvious modification would involve making the plug member 31 or socket member 24 attached to the spool integral with the spool.

It is apparent from the foregoing description that my connector 9 is a great improvement over existing devices for attaching motor controls and pressure sensing devices within a well casing. My connector 9 makes it fast and easy to remove and replace a component within a well casing without removing the drop pipe and pump and without special equipment.

It is understood that the present invention is not confined to the particular construction and arrangements of parts herein illustrated and described, but embraces all such modified forms thereof as may come within the scope of the following claims.

I claim:

1. A pitless water system including an upwardly extending casing, a spool located within said casing having a first terminal passage therein subject to water system pressure, and water system components having a second terminal passage for transmission of fluid pressure located within said casing, and a quick connect and disconnect component connector, said connector comprising, a socket member having a mouth end and a base end attached in fluid-tight communication to one of said terminal passages, a substantially cylindrical socket extending into said socket member from said mouth end toward said base end, an arcuate channel extending around said socket, fluid-tight passage means extending from said channel to said base end, a plug member having one end attached in fluid-tight communication to the other of said terminal passages and having a plug withdrawably engaged within said socket in substantially rigid relation to support said water system components within said casing in protected relation, means for providing a substantially fluid-tight seal between said plug and said socket on each side of said channel, fluid-tight passage means extending through said plug member from a point in communication with said channel to said end adapted for communication with said other passage, said connector being adapted to transmit changes in fluid pressure from said first terminal passage to said second terminal passage, said component and said connector member attached to said second terminal passage being movable as a unit whereby said attached member may be withdrawn from engagement with said other component member and from said casing by applying an upward force on said component.

2. The invention described in claim 1 wherein one of said passage means is restricted thereby to dampen the transmission of pressure shock resulting from sudden changes of fluid pressure within one of said terminal passages.

3. The invention described in claim 1 wherein said means for providing said substantially fluid-tight seal on each side of the channel comprises, a pair of spaced circumferentially extending grooves in said plug, and a yieldable ring seal carried by each of said grooves to engage said plug and said socket in substantially fluid-tight relation on each side of said channel.

4. The invention described in claim 1 wherein said socket is vented to the atmosphere between the fluid-tight seal means on the base end side of said channel and the closed end of said socket.

5. The invention described in claim 1 wherein the end of said connector member attached in fluid-tight communication to the first passage is integral with the spool.

6. The invention described in claim 1 wherein a lift-out bar may be attached to at least one of the components and attached connector member, whereby to apply an upward force on said attached components and connector member.

7. The invention described in claim 1 wherein the system components within said casing include pump motor controls and a control adapter, said control adapter having an inlet opening in communication with the connector member attached in fluid-tight communication to the second terminal passage and having an outlet opening laterally offset from said inlet opening and in communication with said motor controls, said inlet and outlet openings being interconnected by said terminal passage to transfer fluid pressure from said connector to said motor controls.

8. The invention described in claim 7 wherein a lift-out bar is attached to the control adapter and extends therefrom to support said motor controls, said lift-out bar having an upper end located near the top end of said casing in use whereby said connector members may be withdrawn from engagement and said motor controls, control adapter and attached connector member may be removed from said casing by lifting said lift-out bar from said casing.

9. The invention described in claim 1 wherein the connector member attached in fluid-tight communication to the second passage has an air fitting hole in communication with said passage means wherein an air fitting may be attached to supply air to said first terminal passage and the communicating water system.

10. A pitless water system including a casing, a pitless water system component enclosed within said casing and having a first terminal passage, fitting means enclosed within said casing and having a second terminal passage subject to water system pressure, and a connector comprising, a socket member having a mouth end and a base end attached to said fitting means in fluid-tight communication with said second terminal passage, a substantially cylindrical socket extending into said socket member from said mouth end, an arcuate channel extending around said socket, a plug member having one end attached to said water system component in fluid-tight communication with said first terminal passage to thereby support said component, said plug member having a plug withdrawably engaged within said socket in substantially rigid relation to support said water system component within said casing in protected relation, means for providing a substantially fluid-tight seal between said plug and said socket on each side of said channel, fluid-tight passage means extending through said socket member from said channel to said base end and through said plug member from a point in communication with said channel to said end attached to said water system component, said connector being adapted to transmit changes in fluid pressure from one of said terminal passages to the other, said component and said plug member being movable as a unit whereby said plug may be removed from said socket by applying an upward force on said component.

11. In combination, a connector for use as a quick connect and disconnect fluid-tight conduit connection and as a support for a pitless water system component within a vertically oriented casing, and a substantially vertical casing enclosing fitting means in communication with said water system pressure and enclosing a water system component in protected relation, said connector comprising, a plug member and a socket member adapted for engagement in substantially fluid-tight, freely withdrawable relation, one of said members being attached to said fitting means in supported relation and having a first passage for communication with said water system pressure, the other of said members being attached to said component in supporting relation and having a second passage for communication with said component, said members when engaged forming between them a substantially rigid connector to support said component within said casing in protected relation and having a fluid-tight channel in communication with said first and second passages, said component and said attached connector member being movable as a unit whereby said attached member may be removed from said casing by applying an upward force on said component, the volume of said channel being unaltered during the initial withdrawal of said plug member from said socket member.

12. The invention described in claim 11 wherein any cavity which is formed between said plug member and said socket member when said members are engaged is vented to the atmosphere surrounding said members.

References Cited by the Examiner
UNITED STATES PATENTS

| | | | |
|---|---|---|---|
| 2,690,713 | 10/54 | Urmann et al. | 103—25 |
| 2,772,898 | 12/56 | Seeler | 285—190 |
| 2,787,220 | 4/57 | Patterson et al. | 103—6 |
| 2,823,699 | 2/58 | Willis | 285—14 |
| 2,906,492 | 9/59 | Conrad | 251—325 |
| 3,054,022 | 9/62 | Baker | 317—99 |

LAURENCE V. EFNER, *Primary Examiner*.
ROBERT M. WALKER, *Examiner*.